United States Patent
Retzbach et al.

(10) Patent No.: US 8,118,311 B2
(45) Date of Patent: Feb. 21, 2012

(54) CLAMPING DEVICE

(75) Inventors: Thomas Retzbach, Bonnigheim (DE); Michael Haag, Abstatt (DE)

(73) Assignee: Schunk GmbH & Co. KG Spann-und Greiftechnik, Lauffen (DE)

( * ) Notice: Subject to any disclaimer, the term of this patent is extended or adjusted under 35 U.S.C. 154(b) by 803 days.

(21) Appl. No.: 12/097,907

(22) PCT Filed: Nov. 2, 2006

(86) PCT No.: PCT/EP2006/010584
§ 371 (c)(1),
(2), (4) Date: Oct. 10, 2008

(87) PCT Pub. No.: WO2007/073796
PCT Pub. Date: Jul. 5, 2007

(65) Prior Publication Data
US 2009/0273145 A1    Nov. 5, 2009

(30) Foreign Application Priority Data
Dec. 19, 2005 (DE) .......... 10 2005 061 012

(51) Int. Cl.
*B23B 31/20*    (2006.01)
(52) U.S. Cl. ......... 279/43.1; 279/46.2; 279/50; 279/103
(58) Field of Classification Search .......... 279/9.1, 279/102, 50, 57, 46.1, 46.2, 87, 96, 46.3, 279/46.4, 46.5, 46.6, 46.7, 46.8, 74, 146, 279/139, 134, 140, 141, 902, 51, 53, 52, 103
See application file for complete search history.

(56) References Cited

U.S. PATENT DOCUMENTS

| 6,470,553 | B1 | 10/2002 | Retzbach | |
| 6,666,461 | B1 * | 12/2003 | Retzbach | 279/9.1 |
| 7,217,072 | B1 * | 5/2007 | Haimer | 409/234 |
| 2002/0171208 | A1 * | 11/2002 | Lechot et al. | 279/9.1 |

FOREIGN PATENT DOCUMENTS

| DE | 101 27 303 A1 | 12/2002 |
| JP | 61-154147 | 10/1986 |
| JP | 2003-517941 | 6/2003 |

* cited by examiner

*Primary Examiner* — Daniel Howell
*Assistant Examiner* — Paul M Janeski
(74) *Attorney, Agent, or Firm* — Berenato & White, LLC

(57) ABSTRACT

The invention relates to a clamping device with a base body (2) which comprises a central receptacle (5) for a component or tool to be clamped, in the base body (2) at least one groove (6) being formed which is open to a face side of the base body (2), and with at least one clamping wedge (9b) which can be pressed axially into the groove (6) from the open face side of the latter to radially deform an inner wall section (7) lying between the groove (6) and the receptacle, which is characterized in that the wall (10) which defines the groove (6) on the outside is designed to be elastic over at least an axial partial section such that it is elastically deformed to the outside when the at least one clamping wedge (9b) is pressed into the groove (6).

6 Claims, 3 Drawing Sheets

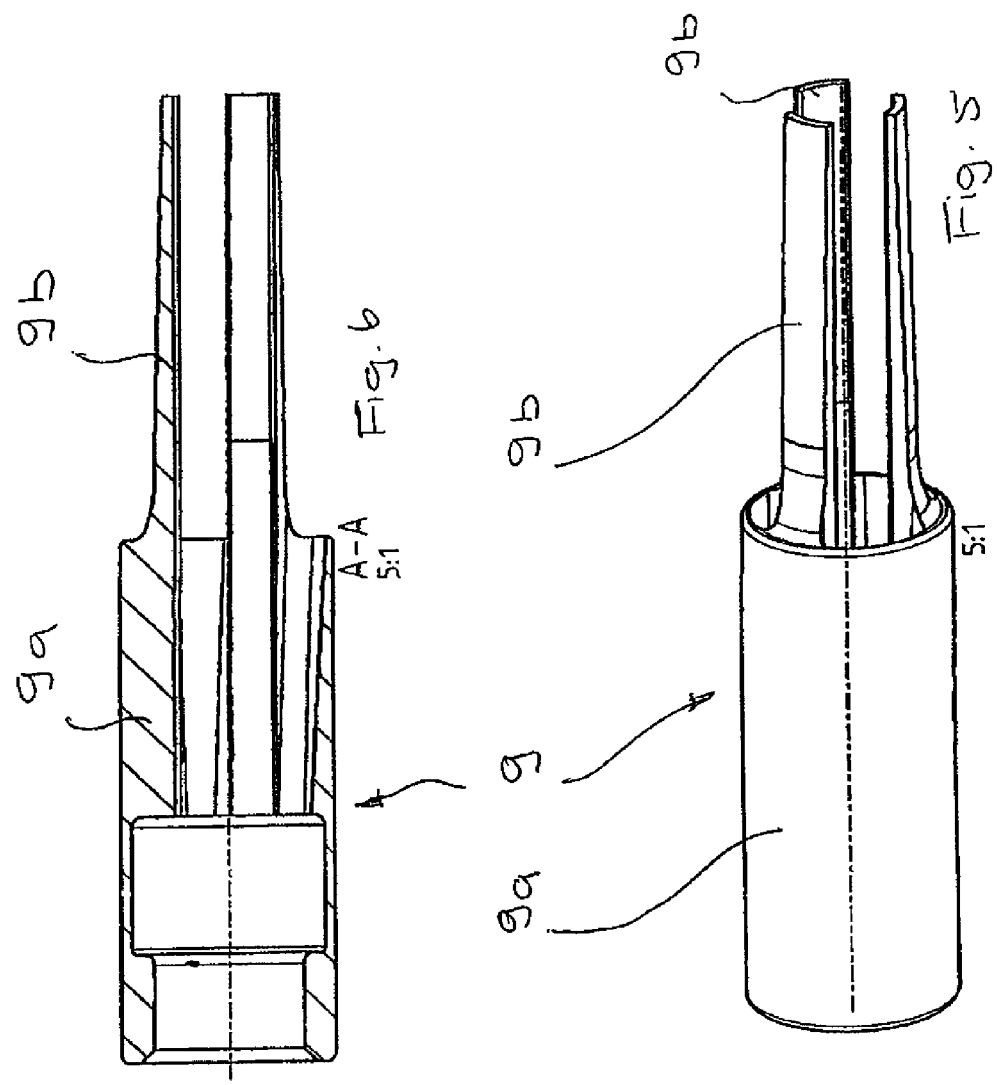

CLAMPING DEVICE

Figure 1:
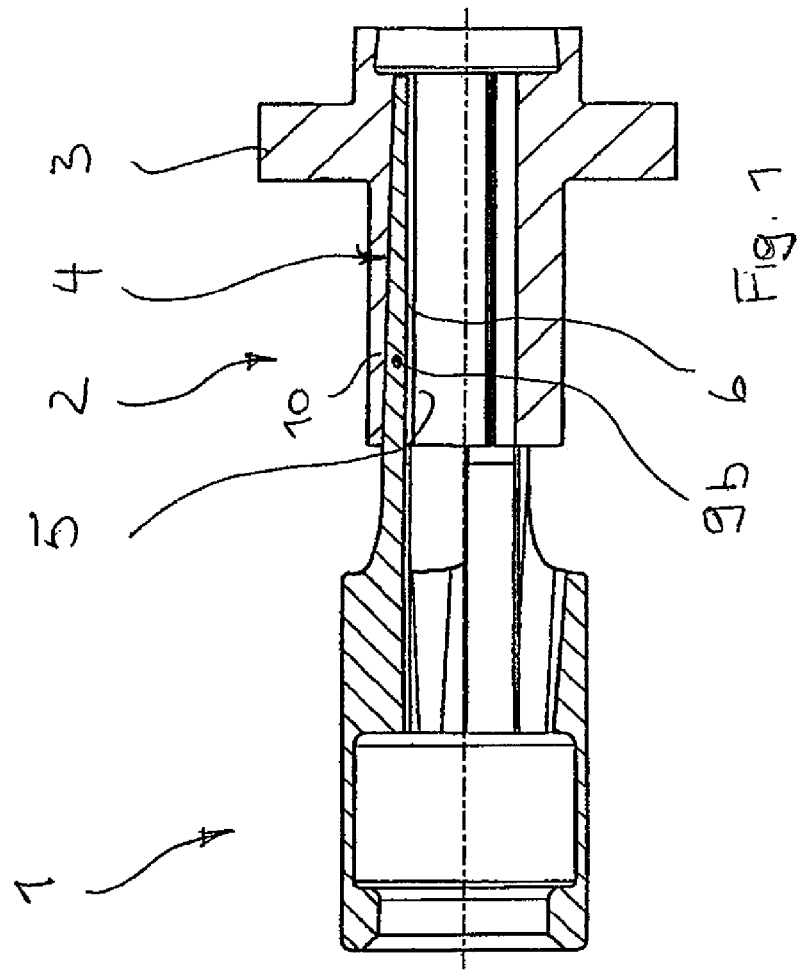

The present invention relates to a clamping device with a base body which comprises a central receptacle for a component or tool which is to be clamped, in the base body at least one groove being formed which is open to a face side of the base body, and with at least one clamping wedge which can be pressed axially into the groove from the open face side of the latter to radially deform the inner wall section lying between the groove and the receptacle, wherein the wall which defines the groove on the outside is designed to be elastic at least over an axial partial section such that it is elastically deformed to the outside when the at least one clamping wedge is pressed into the groove.

These types of clamping device are known from DE 199 61 563 C1 and are used in practice, for example, in order to fix a tool shaft, such as a drill or cutter shaft, on the working spindle of a corresponding machine tool. The known clamping devices have a base body made of a dimensionally stable material in which a central receptacle for a component to be clamped is formed. The central receptacle is surrounded by an annular groove, the inner wall remaining between the annular groove and the receptacle forming a thin-walled clamping sleeve. Furthermore, the known clamping device has a wedge ring as clamping means which has an annular body and a number of clamping tongues disposed on the latter, spaced apart in the circumferential direction, and projecting substantially axially. The clamping tongues have a wedge-shaped cross-section extending towards their free end and by radial deformation of the clamping sleeve can be pressed axially into the annular groove in order to fix a component in the receptacle.

Furthermore, similar clamping devices are known from practice with which the annular groove is not formed continuously, but is divided into three individual chambers which are defined in relation to one another by wall sections. The advantage of the division into individual chambers is that the clamping tongues are positioned by the wall sections lying between the chambers.

The known clamping devices have absolutely proven to be of value in practice. However, problems can arise to the effect that with very high rotation speeds the receptacle can expand due to the centrifugal forces that occur, and then clamping of the tool is no longer reliable.

It is therefore the object of the invention to develop a clamping device of the type specified at the start such that even with high rotation speeds reliable clamping of components can be guaranteed.

According to the present invention this object is solved with a clamping device of the initially mentioned kind which is provided with the features of the characterizing portion of claim 1.

Therefore, the thinking which forms the basis of the invention is to design the outer wall which defines the groove or grooves on the outside not to be dimensionally stable, as in the prior art, but elastically so that it is deformed outwardly when the clamping wedges are driven in. As a result the clamping wedges are constantly pressed inwards due to the elastic reset force of the outer wall by means of which expansion of the receptacle as a result of the centrifugal forces occurring during operation is countered so that reliable clamping is guaranteed, even with very high rotation speeds. If for example a clamping device with a clamping diameter of approximately 3 mm rotates during operation at approximately 400,000 U/min, the clamping diameter is expanded radially by approx. 2 μm due to the centrifugal forces occurring. In order to counter this expansion the wall which defines the groove on the outside is expanded by a pre-specifiable factor. It has proven to be advantageous if the radial expansion comes within the range of between 4 μm and 15 μm, and in particular within the range of approximately 10 μm so that during operation at least a large part of the clamping force is maintained.

In a way known per se the groove can be in the form of an annular groove surrounding the receptacle. Alternatively it is possible to form a number of grooves in the base body which are disposed, evenly distributed, about the receiving body. In this case it can be advantageous to connect the grooves to the receptacle in their central region, as viewed circumferentially, by means of small cuts in the inner wall lying between the grooves and the receptacle. In this way individual inner wall sections are formed which can easily be elastically deformed, and in addition ensure that comparably large clamping paths can be produced. Tests have shown that with a clamping diameter of 3 mm, in the case of empty clamping a radial clamping path of approximately 15 μm can be produced, i.e. the diameter of the receptacle can be reduced by approx. 30 μm. With the known clamping devices with a closed clamping sleeve the achievable radial clamping paths come within the range of between approximately 3 and 4 μm.

In a way known per se the contour of the grooves can be adapted to the contour of the clamping wedges so that the clamping wedges are positioned in the grooves.

Figure 2:
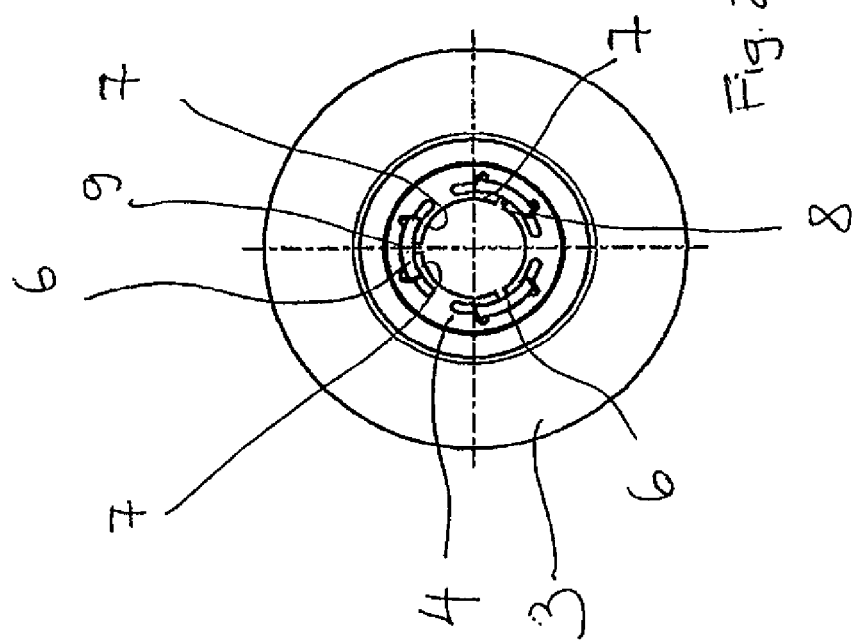
Figure 3:
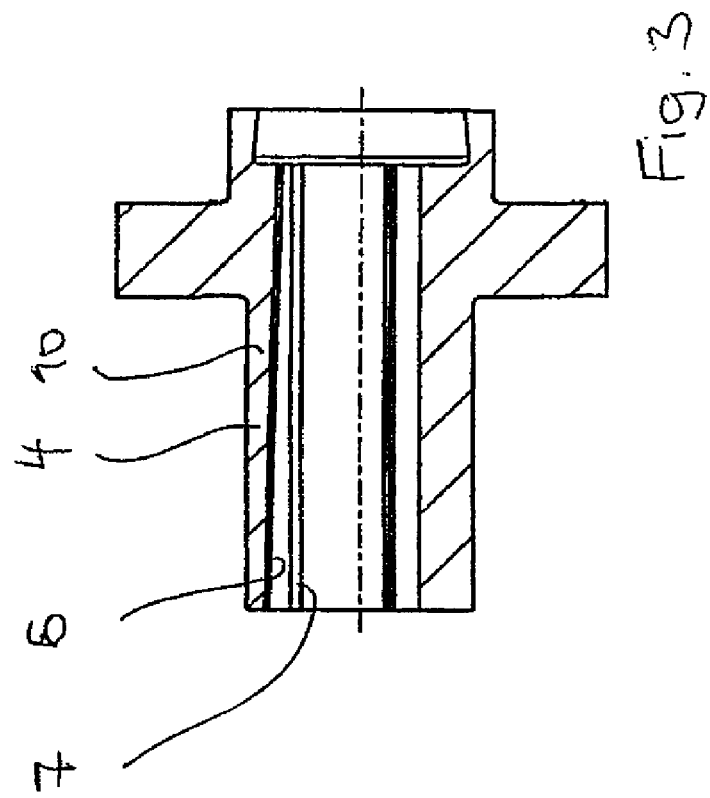
Figure 4:
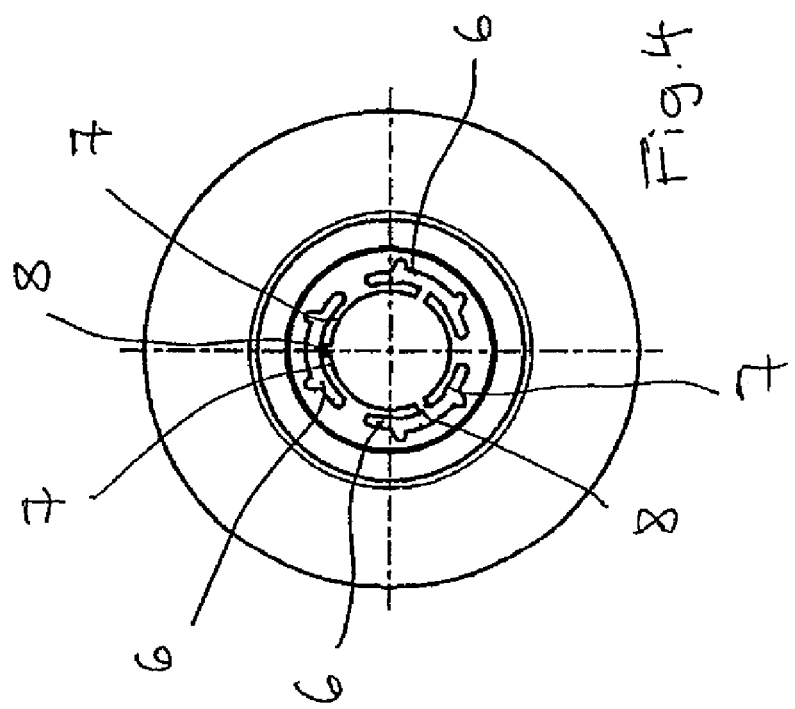

With regard to further advantageous embodiments of the invention, reference is made to the sub-claims and to the following description of an exemplary embodiment with reference to the attached drawings. The drawings show as follows:

FIG. 1 a longitudinal section of an embodiment of a clamping device according to the invention FIG. 2 a front view of the clamping device from FIG. 1, FIG. 3 a longitudinal section of the base body of the clamping device from FIG. 1, FIG. 4 a front view of the base body from FIG. 3, FIG. 5 a perspective view of the wedge ring of the clamping device from FIG. 1, and FIG. 6 a longitudinal section of the wedge ring from FIG. 5.

In the figures an embodiment of a clamping device 1 according to the present invention is shown. The clamping device 1 comprises a base body 2 with a dimensionally stable attachment flange 3 by means of which the base body can be attached, for example, to the working spindle of a machine tool. Furthermore, the base body 2 has a connection shaft 4 projecting from the flange 3 on the left-hand side of the figures, and is provided with a central receptacle 5 extending axially through the base body 2 into which a cylindrical shaft of a tool, such as for example a drill or a cutter, can be inserted. Within the connection shaft 4 a total of three grooves 6 are formed which are disposed, evenly distributed, about the receptacle 5 as viewed in the circumferential direction. The grooves 6 are in the form of annular sections and are disposed concentrically to the receptacle 5. The grooves 6, the axial length of which corresponds approximately to the required clamping region, are defined towards the receptacle 5 by relatively thin and therefore elastically deformable inner wall sections 7, these inner wall sections 7 being broken by narrow cuts 8 in the centre of the grooves 6, as viewed in the circumferential direction.

As can be seen particularly well in FIG. 1, the grooves 6 have an approximately wedge-shaped cross-section which is formed such that the outer walls of the grooves 6 extend conically from the free end of the connection shaft 4, whereas the inner walls of the grooves 6 are cylindrical.

In order to fix a tool shaft or similar within the receptacle 5 a wedge ring 9 is provided which has an annular body 9a and three clamping tongues 9b which are disposed, evenly spaced apart from one another in the circumferential direction, on the annular body 9a, and extend substantially in the axial direction. The clamping tongues 9b extend towards their free ends in a wedge shape, their inner walls lying on a cylinder surface the diameter of which corresponds approximately to the inner diameter of the grooves 6, and the outer walls lying correspondingly to the outer walls of the grooves 6 on a cone surface extending towards the free clamping tongue ends. The clamping tongues 9b of the wedge ring 9 can be driven into the grooves 6 of the base body 2 from the face side of the connection shaft 4, by means of which the thin inner wall sections 7 on the inner side of the grooves 6 are deformed radially to the inside, and in this way fix a tool shaft or similar placed into the receptacle 5.

According to the invention the outer wall 10 of the base body 2 is formed in the region of the connection shaft 4 with thick walls in comparison to the elastic inner wall sections between the grooves 6 and the retaining element 5, but it still has elasticity such that it is deformed outwardly if the clamping tongues 9b of the wedge ring 9 are driven into the grooves 6. During operation therefore radially inwardly directed reset forces are applied from the wall 10 onto the clamping tongues 9b and prevent the base body 2 from expanding due to the high centrifugal forces occurring during operation. As a result the elastic deformation of the wall of the connection shaft 4 means that reliable clamping is guaranteed even with high rotation speeds.

The invention claimed is:

1. A clamping device with a base body (2) which comprises a central receptacle (5) for a component or tool to be clamped, in the base body (2) at least one groove (6) being formed which is open to a face side of the base body (2), and with at least one clamping wedge (9b) which can be pressed axially into the groove (6) from the open face side of the latter to radially deforming an inner wall section (7) lying between the groove (6) and the receptacle, wherein the wall (10) which defines the groove (6) on the outside is designed to be elastic over at least an axial partial section such that it is elastically deformed to the outside when the at least one clamping wedge (9b) is pressed into the groove (6), characterised in that in the base body (2) a number of grooves (6) are formed which are disposed, evenly distributed, about the receptacle (5), and that spaced apart evenly in the circumferential direction, a number of clamping wedges (9b) are provided on an annular body (9a) and project substantially axially from the latter.

2. The clamping device according to claim 1, characterised in that in their central region, as viewed in the circumferential direction, the grooves (6) are connected to the receptacle (5) by narrow cuts (8) in the inner wall (7).

3. The clamping device according to claim 2, characterised in that the contour of the grooves (6) is adapted to the contour of the clamping wedges (9b) so that the clamping wedges (9b) are positioned in the grooves (6).

4. The clamping device according to claim 1, characterised in that a total of three clamping wedges (9b) are disposed, spaced apart evenly, on the annular body (9a).

5. The clamping device according to claim 1, characterised in that the outer walls of the clamping wedges (9b) lie on a cone surface extending towards the free clamping wedge ends.

6. The clamping device according to claim 5, characterised in that the outer walls of the grooves (6) are formed substantially complementarily to the outer walls of the clamping wedges (9b) and correspondingly extending in a cone shape in the insertion direction of the clamping wedges (9b).

\* \* \* \* \*